US012657413B2

(12) United States Patent
Bozyigit et al.

(10) Patent No.: US 12,657,413 B2
(45) Date of Patent: Jun. 16, 2026

(54) WORKFLOW IMPROVEMENTS IN ELECTRONIC DEVICES FOR SCANNING OPTICAL PATTERNS

(71) Applicant: Scandit AG, Zurich (CH)

(72) Inventors: Deniz Bozyigit, Zurich (CH); Giovanni Minutiello, Viareggio (IT); Christian Floerkemeier, Zurich (CH)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 18/947,289

(22) Filed: Nov. 14, 2024

(65) Prior Publication Data

US 2025/0217612 A1     Jul. 3, 2025

Related U.S. Application Data

(60) Provisional application No. 63/616,027, filed on Dec. 29, 2023.

(51) Int. Cl.
*G06K 7/10* (2006.01)
*G06K 7/14* (2006.01)
*H04N 23/60* (2023.01)
*H04N 23/63* (2023.01)

(52) U.S. Cl.
CPC ....... *G06K 7/10722* (2013.01); *G06K 7/1413* (2013.01); *H04N 23/632* (2023.01); *H04N 23/64* (2023.01)

(58) Field of Classification Search
CPC .......................... G06K 7/10722; G06K 7/1413
USPC .................................................... 235/462.41
See application file for complete search history.

(56) References Cited

U.S. PATENT DOCUMENTS

| | | | |
|---|---|---|---|
| 5,308,966 | A | 5/1994 | Danielson et al. |
| 5,510,604 | A | 4/1996 | England |
| 6,082,619 | A | 7/2000 | Ma et al. |
| 7,121,469 | B2 | 10/2006 | Dorai et al. |
| 7,159,780 | B2 | 1/2007 | Christian |
| 7,416,125 | B2 | 8/2008 | Wang et al. |
| 7,606,741 | B2 | 10/2009 | King et al. |

(Continued)

FOREIGN PATENT DOCUMENTS

| | | |
|---|---|---|
| WO | 2007038680 A2 | 4/2007 |
| WO | 2019135163 A2 | 7/2019 |

OTHER PUBLICATIONS

Scandit Augmented Reality Retail Price Label Verification, Scandit, Available Online at: https://www.scandit.com/resources/videos/scandit-augmented-reality-retail-price-label-verification/, Sep. 26, 2018, 1 page.

(Continued)

*Primary Examiner* — Toan C Ly
(74) *Attorney, Agent, or Firm* — Kilpatrick Townsend & Stockton LLP

(57) ABSTRACT

Features described herein generally relate to electronic devices for scanning optical patterns and workflow improvements in such electronic devices. An image depicting an optical pattern in a scene can be captured using a camera of an electronic device. The optical pattern can be decoded to obtain code data for the optical pattern. The code data can be inserted into an application object corresponding to an application installed on the electronic device. The application object can be sent to the application such that information associated with the optical pattern can be used by the application.

20 Claims, 11 Drawing Sheets

(56)     References Cited

U.S. PATENT DOCUMENTS

| | | | |
|---|---|---|---|
| 8,596,540 | B2 | 12/2013 | Adelmann |
| 9,836,635 | B2 | 12/2017 | Negro et al. |
| 10,191,242 | B2 | 1/2019 | Palmeri |
| 10,229,301 | B2 | 3/2019 | Cumoli et al. |
| 10,426,442 | B1 | 10/2019 | Schnorr |
| 10,452,959 | B1 | 10/2019 | Gautam et al. |
| 10,818,014 | B2 | 10/2020 | Xu et al. |
| 10,963,658 | B1 | 3/2021 | Bloch et al. |
| 2002/0023958 | A1 | 2/2002 | He et al. |
| 2006/0061806 | A1 | 3/2006 | King et al. |
| 2006/0249581 | A1 | 11/2006 | Smith |
| 2009/0108071 | A1 | 4/2009 | Carlson |
| 2009/0212113 | A1 | 8/2009 | Chiu et al. |
| 2009/0224050 | A1 | 9/2009 | Hayakawa et al. |
| 2009/0304234 | A1 | 12/2009 | Kondo et al. |
| 2010/0187311 | A1 | 7/2010 | Van Der Merwe et al. |
| 2013/0112750 | A1 | 5/2013 | Negro et al. |
| 2016/0307006 | A1 | 10/2016 | Wang |
| 2016/0371633 | A1* | 12/2016 | Stout .................. G06K 17/0022 |
| 2017/0032311 | A1 | 2/2017 | Rizzolo et al. |
| 2017/0187812 | A1* | 6/2017 | Chen ........................ H04L 67/51 |
| 2018/0157880 | A1* | 6/2018 | Nair ................... G06K 7/10603 |
| 2019/0188435 | A1 | 6/2019 | Davis et al. |
| 2019/0244043 | A1 | 8/2019 | Bradley et al. |
| 2019/0325183 | A1 | 10/2019 | Tscherepanow et al. |

OTHER PUBLICATIONS

U.S. Appl. No. 13/144,354, Non-Final Office Action mailed on Jan. 18, 2013, 11 pages.

U.S. Appl. No. 13/144,354, Notice of Allowability mailed on Aug. 16, 2013, 7 pages.

U.S. Appl. No. 16/920,061, First Action Interview Pilot Program Pre-Interview Communication mailed on Sep. 16, 2020, 4 pages.

U.S. Appl. No. 16/920,061, Notice of Allowance mailed on Dec. 2, 2020, 8 pages.

* cited by examiner

900

1000

From FIG. 8, Block 802 — 902

Illuminate a scene — 904

Detect input — 906

Generate command — 908

Generate code data for an optical pattern — 910

Insert the code data into an application object corresponding to an application — 1002

Send the application object to the application — 1004

Return to FIG. 8, Block 804 — 1006

WORKFLOW IMPROVEMENTS IN ELECTRONIC DEVICES FOR SCANNING OPTICAL PATTERNS

CROSS-REFERENCE TO RELATED APPLICATIONS

This application claims priority to U.S. Provisional Application No. 63/616,027, filed on Dec. 29, 2023, the disclosure of which is incorporated by reference in its entirety for all purposes.

BACKGROUND

This disclosure generally relates to electronic devices. Particularly, and without limitation, this disclosure relates to electronic devices for scanning optical patterns and workflow improvements in such electronic devices. Objects in various scenes are sometimes labeled with a barcode for identifying and tracking those objects within the respective scenes. Traditionally, the tracking has been facilitated by using a specialized scanner such as a laser-based barcode scanner to decode these barcodes. With the widespread adoption of mobile devices and other computing devices that include cameras, users have found it convenient to decode barcodes by using the cameras included in these devices to capture images of the barcodes. An example of a method for using a smartphone to decode a barcode is provided in U.S. Pat. No. 8,596,540, granted on Dec. 3, 2013.

BRIEF SUMMARY

Some embodiments described herein pertain to electronic devices for scanning optical patterns and workflow improvements in such electronic devices.

In various embodiments, an electronic device includes: a processing system including one or more processors; and one or more computer readable storage media storing instructions which, when executed by the one or more processors, cause the electronic device to perform operations including: generating a capturing command; in response to generating the capturing command, capturing, using a camera of the electronic device, an image depicting one or more optical patterns in a scene; decoding, based on the image, an optical pattern of the one or more optical patterns to obtain code data for the optical pattern; inserting the code data into an application object corresponding to an application of a plurality of applications installed on the electronic device; and sending the application object to the application.

In some embodiments, the optical pattern is a first optical pattern, the code data is first code data, and wherein the instructions which, when executed by the one or more processors, cause the electronic device to perform further operations including: generating a scanning command; in response to generating the scanning command, generating, using a laser scanner of the electronic device, second code data for a second optical pattern of the one or more optical patterns; and sending the second code data to the application.

In some embodiments, the scanning command is generated in response to input received at a button of the electronic device.

In some embodiments, the capturing command is generated in response to input received at a display of the electronic device.

In some embodiments, the instructions which, when executed by the one or processors, cause the electronic device to perform further operations including: prior to generating a capturing command: displaying, on a display of the electronic device, a graphical user interface page of the application, a preview of the scene, and a capturing button, wherein the preview of the scene and the capturing button partially overlay the graphical user interface page.

In some embodiments, the capturing command is generated in response to a user touching a portion of a surface of the display, the portion of the surface corresponding to a position in which the capturing button is displayed.

In some embodiments, the inserting the code data into the application object includes accessing user data stored in a cloud-based server and formatting the application object based on the user data.

In some embodiments, the user data identifies an operating system of the electronic device.

In some embodiments, the user data identifies an application type for the application.

In some embodiments, the optical pattern is a first optical pattern, the code data is first code data, the application object is a first application object, and wherein the instructions which, when executed by the one or more processors, cause the electronic device to perform further operations including: generating a scanning command; in response to generating the scanning command, generating, using a laser scanner of the electronic device, second code data for a second optical pattern of the one or more optical patterns; inserting the second code data into a second application object corresponding to the application; and sending the second application object to the application.

In some embodiments, the optical pattern is a first optical pattern, wherein the code data is first code data, wherein the application object is a first application object, wherein the application is a first application, and wherein the instructions which, when executed by the one or more processors, cause the electronic device to perform further operations including: decoding, based on the image, a second optical pattern of the one or more optical patterns to obtain second code data for the second optical pattern; inserting the second code data into a second application object corresponding to a second application of the plurality of applications installed on the electronic device; and sending the second application object to the second application.

Some embodiments include a method that includes: generating a capturing command; in response to generating the capturing command, capturing, using a camera of an electronic device, an image depicting one or more optical patterns in a scene; decoding, based on the image, an optical pattern of the one or more optical patterns to obtain code data for the optical pattern; inserting the code data into an application object corresponding to an application of a plurality of applications installed on the electronic device; and sending the application object to the application.

In some embodiments, the optical pattern is a first optical pattern, the code data is first code data, and the method further includes: generating a scanning command; in response to generating the scanning command, generating, using a laser scanner of the electronic device, second code data for a second optical pattern of the one or more optical patterns; and sending the second code data to the application.

In some embodiments, the method further includes: prior to generating a capturing command: displaying, on a display of the electronic device, a graphical user interface page of the application, a preview of the scene, and a capturing button, wherein the preview of the scene and the capturing button partially overlay the graphical user interface page, wherein the capturing command is generated in response to a user touching a portion of a surface of the display, the portion of the surface corresponding to a position in which the capturing button is displayed.

In some embodiments, the optical pattern is a first optical pattern, the code data is first code data, the application object is a first application object, and wherein the method further includes: generating a scanning command; in response to generating the scanning command, generating, using a laser scanner of the electronic device, second code data for a second optical pattern of the one or more optical patterns; inserting the second code data into a second application object corresponding to the application; and sending the second application object to the application.

In some embodiments, the optical pattern is a first optical pattern, wherein the code data is first code data, wherein the application object is a first application object, wherein the application is a first application, and wherein the method further includes: decoding, based on the image, a second optical pattern of the one or more optical patterns to obtain second code data for the second optical pattern; inserting the second code data into a second application object corresponding to a second application of the plurality of applications installed on the electronic device; and sending the second application object to the second application.

Some embodiments include one or more non-transitory computer-readable media storing computer-readable instructions which, when executed by one or more processors of an electronic device, cause the electronic device to perform operations including: displaying, on a display of the electronic device, a graphical user interface page of an application of a plurality of applications installed on the electronic device, a preview of a scene, and a capturing button, wherein the preview of the scene and the capturing button partially overlay the graphical user interface page; generating a capturing command, wherein the capturing command is generated in response to a user touching a portion of a surface of the display, the portion of the surface corresponding to a position in which the capturing button is displayed; in response to generating the capturing command, capturing, using a camera of the electronic device, an image depicting one or more optical patterns in a scene; decoding, based on the image, an optical pattern of the one or more optical patterns to obtain code data for the optical pattern; inserting the code data into an application object corresponding to an application of a plurality of applications installed on the electronic device by converting a first format of the code data to a second format associated with the application and generating the application object based on the code data formatted in the second format; and sending the application object to the application.

In some embodiments, the optical pattern is a first optical pattern, the code data is first code data, and wherein the instructions which, when executed by the one or more processors, cause the electronic device to perform further operations including: generating a scanning command; in response to generating the scanning command, generating, using a laser scanner of the electronic device, second code data for a second optical pattern of the one or more optical patterns; and sending the second code data to the application.

In some embodiments, the optical pattern is a first optical pattern, the code data is first code data, the application object is a first application object, and wherein the instructions which, when executed by the one or more processors, cause the electronic device to perform further operations including: generating a scanning command; in response to generating the scanning command, generating, using a laser scanner of the electronic device, second code data for a second optical pattern of the one or more optical patterns; inserting the second code data into a second application object corresponding to the application; and sending the second application object to the application.

In some embodiments, the optical pattern is a first optical pattern, wherein the code data is first code data, wherein the application object is a first application object, and wherein the application is a first application, and wherein the instructions which, when executed by the one or more processors, cause the electronic device to perform further operations including: decoding, based on the image, a second optical pattern of the one or more optical patterns to obtain second code data for the second optical pattern; inserting the second code data into a second application object corresponding to a second application of the plurality of applications installed on the electronic device; and sending the second application object to the second application.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
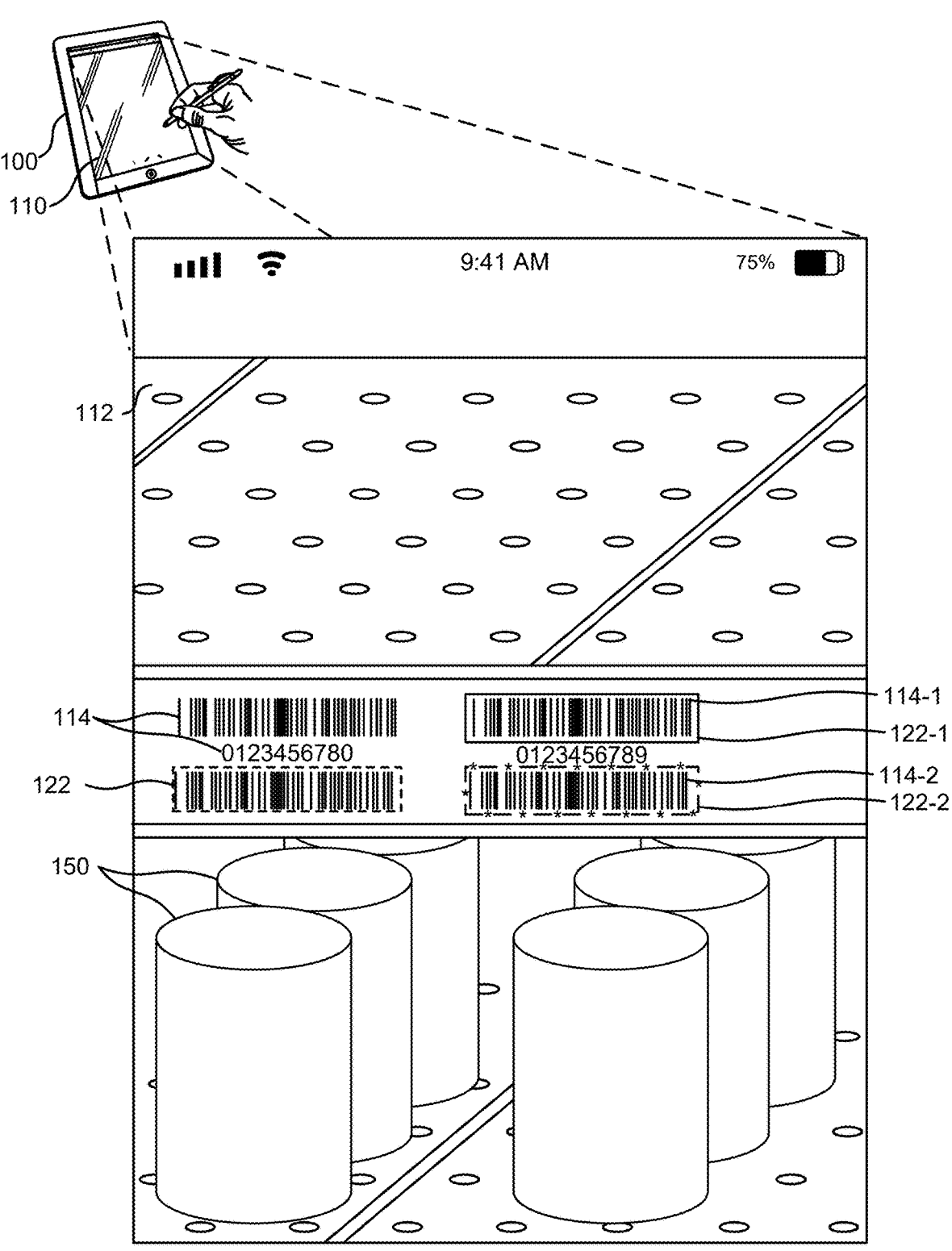
FIG. 1 depicts an example technique for automated recognition and decoding of a pattern in an image containing multiple patterns, in accordance with some embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Entities and organizations that manage items such as goods and other objects often rely on portable electronic devices to facilitate such management. For example, an entity storing items in a warehouse may issue a fleet of portable electronic devices to warehouse employees to scan barcodes associated with the items stored in the warehouse and to track the items throughout their tenancy in the warehouse based on their barcodes. These devices are often dedicated for one or more item management tasks. For example, these devices often incorporate laser barcode scanners that can scan barcodes and output code data for the scanned barcodes to item management software installed on these devices. However, entities and organizations are often constrained by the hardware and software capabilities of these devices. As a result, an entity or organization may rely on different sets of portable electronic devices for different tasks such as one set of electronic devices for an item inventory task and another set of electronic devices for an order collection task. Therefore, it may be desirable to expand the capabilities of these devices such that they may be better suited for decoding barcodes and/or managing a workflow for providing decoded barcodes.

Smartphones and other portable computing devices that have cameras and incorporate optical pattern decoding functionality have become prevalent. As such, applications that can utilize decoded optical patterns and/or information extracted from decoded optical patterns (e.g., spreadsheets, cataloging, tracking applications, and the like) have also become prevalent. For example, an application store for a smartphone may have hundreds of applications that can utilize code data and/or other information associated with optical patterns that are available for download and installation on the smartphone. As such, users have found devices incorporating camera based optical pattern decoding functionality to be convenient. Typically, these applications will have one or more fields in a graphical user interface page into which a decoded optical pattern and/or data pertaining to a decoded optical pattern can be inserted (e.g., a text field). To facilitate insertion of code data and/or other information pertaining to an optical pattern in these fields, add-ons such as custom keyboards with scanning buttons are typically utilized in conjunction with these applications. Therefore, it may be desirable to expand the capabilities of these devices such that they may be better suited for facilitating the integration of code data associated with barcodes into applications.

The developed approach overcomes these challenges and others by providing workflow improvements in an electronic device for scanning optical patterns. In some implementations, the electronic device for scanning optical patterns includes a camera for capturing images of optical patterns in a scene and/or a laser scanner for acquiring code data for optical patterns in the scene. The electronic device can be configured to operate in a camera scanning mode to capture images of the optical patterns in the scene and in a laser scanning mode to acquire code data for the optical patterns in the scene. Additionally, one or more applications can be installed on the electronic device. Using the techniques described herein, information associated with optical patterns can be provided to and utilized by applications even in the case such applications do not include fields for inserting such information. In this way, code data derived from optical patterns scanned by different scanning devices in an electronic device can be provided to different applications installed on the electronic device without modification of the electronic device. As such, entities and organizations employing different fleets of electronic devices having different scanning mechanisms can utilize these electronic devices to acquire and import information associated with barcodes into the applications installed on these devices.

In some implementations, a method includes ascertaining whether the electronic device is in a camera scanning mode or a laser scanning mode. In response to ascertaining that the electronic device is in the camera scanning mode, a graphical user interface page of an application installed on the electronic device, a preview of the scene, and a capturing button are displayed on a display of the electronic device. In some implementations, the preview of the scene and the capturing button at least partially overlay the graphical user interface page. The scene can include one or more optical patterns. While the preview of the scene and the capturing button are being displayed, an input to the electronic device can be detected. In some implementations, the input is detected in response to a user touching a portion of a surface of the display that corresponds to a position in which the capturing button is displayed. In some implementations, the input is detected in response to a user touching or depressing a button of the electronic device. In some implementations, the input is detected in response to a voice command received at an audio input device of the electronic device.

In response to detecting the input, a capturing command is generated and, in response to generating the capturing command, an image depicting an optical pattern in the scene is captured, using a camera of the electronic device. Based on the image, the optical pattern can be decoded to obtain code data for the optical pattern, and the code data can be inserted into an application object that corresponds to an application installed on the electronic device. In some implementations, the application can be one of a plurality of applications installed on the electronic device. In some implementations, user data stored in a cloud-based server can be accessed and the application object and/or code data can be formatted based on the user data. The user data can identify an operating system of the electronic device and an application type for the application. The application object can then be sent to the application.

In response to ascertaining that the electronic device is in the laser scanning mode, the same and/or another scene is illuminated with a laser light source. While the scene is being illuminated with the laser light source, an input to the electronic device can be detected. In some implementations, the input is detected in response to a user touching or depressing the button of the electronic device. In some implementations, the input is detected in response to voice command received at the audio input device of the electronic device. In response to detecting the input, a scanning command is generated and, in response to generating the scanning command, code data for an optical pattern in the scene is generated using a laser scanner of the electronic device. The code data can be sent to the application and/or the code data can be inserted into an application object corresponding to the application that is then sent to the application and/or a different application. In some implementations, the application object and/or code data can be formatted based on the same and/or different user data stored in the cloud-based server.

In some implementations, in response to the application object and/or the code data being sent to the application, it can be again ascertained whether the electronic device is in the camera scanning mode or the laser scanning mode and the method can proceed according to the camera scanning mode or the laser scanning mode as described above. In some implementations, in the camera scanning mode, another image depicting the same optical pattern and/or another optical pattern in the scene can be captured and the same optical pattern and/or the other optical pattern can be decoded to obtain code data. As described above, the code data can be inserted into an application object for the application. In some implementations, the code can be inserted into an application object for another application installed on the electronic device. Similarly, in some implementations, in the laser scanning mode, code data for the same optical pattern and/or another optical pattern in the scene can be generated and sent to the same application and/or the other application and/or inserted into an application object for same application and/or the other application.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

FIG. 1 depicts an example technique for automated detection and decoding of one or more optical patterns in an image, in accordance with some embodiments. In FIG. 1, a system 100 (e.g., a mobile device) comprises a display 110 and a camera (not shown). The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depict the real world scene as viewed through the field of view of the camera. The real-world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 114-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded. Examples of graphical elements used during detecting and decoding optical patterns can be found in U.S. application Ser. No. 16/905,722, filed on Jun. 18, 2020, which is incorporated by reference for all purposes. Optical patterns can also be tracked, as described in U.S. patent application Ser. No. 16/920,061, filed on Jul. 2, 2020, which is incorporated by reference for all purposes.

Figure 2:
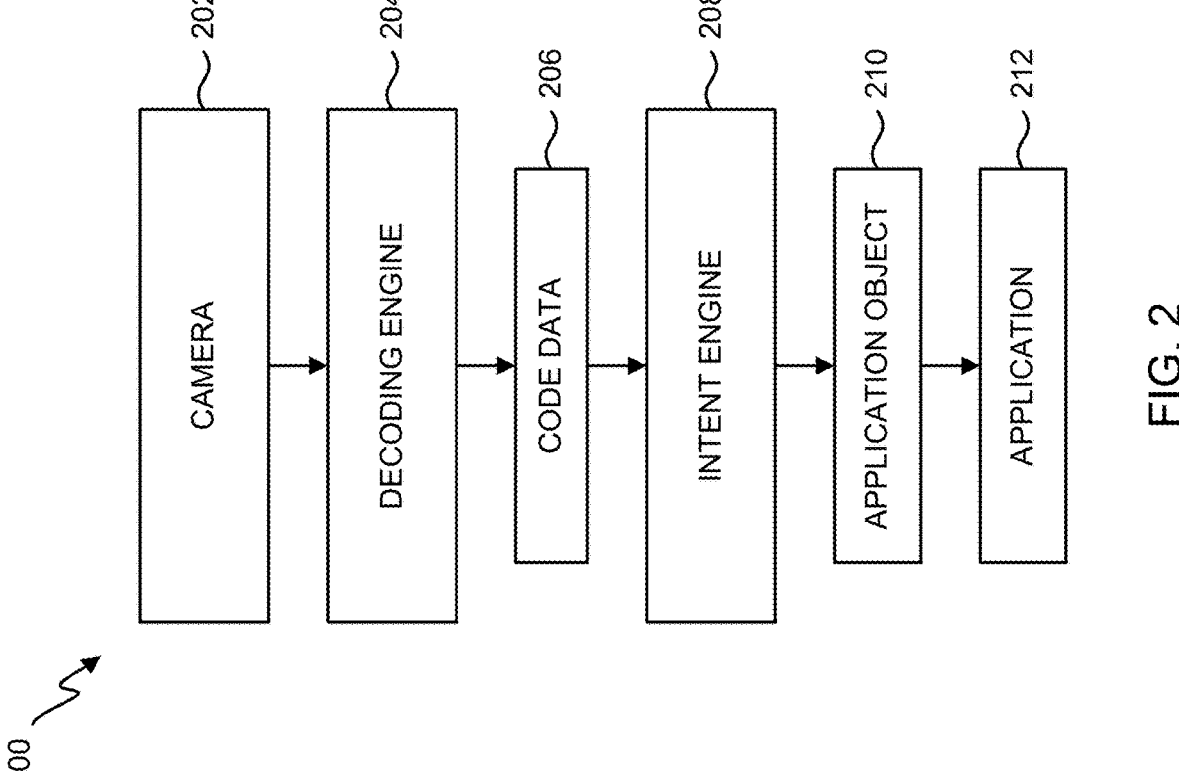
FIG. 2 is a simplified diagram of an embodiment of a workflow in an electronic device for scanning optical patterns, in accordance with some implementations.

FIG. 2 is a simplified diagram 200 of an embodiment of a workflow in an electronic device for scanning optical patterns. As shown in FIG. 2, the electronic device can include a camera 202 and an operating system (not shown) such as the Android operating system. The operating system can include a decoding engine 204, an intent engine 208, and an application 212. The application 212 can be one of a plurality of applications installed on the electronic device.

The electronic device, including the decoding engine 204 and intent engine 208, can include one or more general-purpose processors or special-purpose processors that are specifically designed to perform the techniques described herein. Such special-purpose processors can be application-specific integrated circuits (ASICs), field-programmable gate arrays (FPGAs), and programmable logic devices (PLDs) which are general-purpose components that are physically and electrically configured to perform the functions detailed herein. Such general-purpose processors can execute special-purpose software that is stored using one or more non-transitory processor-readable mediums, such as random-access memory (RAM), flash memory, a hard disk drive (HDD), or a solid-state drive (SSD). Examples of general-purpose processors include microprocessors, micro-controllers, central processing units, graphical processing units, digital signal processors, ASICs, FPGAs, PLDs, or any combination thereof. The general-purpose processors can include a plurality of cores, a plurality of arrays, one or more coprocessors, and/or one or more layers of local cache memory.

The camera 202 can be configured to capture images of a scene, which can include one or more optical patterns. In some implementations, the camera can include one or more optical elements, one or more illumination units, and one or more image capturing units. The one or more optical elements, illumination units, and image capturing units can be configured to capture images of a scene that includes one or more optical patterns. In some implementations, to facilitate the capture of images, a preview image of the scene and a capturing button are displayed on a display (not shown) of the electronic device. In some implementations, a graphical user interface page of the application 212 is also displayed on the display. The preview image of the scene and the capturing button can be displayed such that they at least partially overlay the graphical user interface page. A detailed description of utilizing scene a preview, a graphical overlay such as a capturing button, and a graphical user interface page of an application is described in commonly owned U.S.

patent application Ser. No. 18/331,877, which is hereby incorporated by reference in its entirety and for all purposes.

While the preview of the scene and the capturing button are being displayed, an input to the electronic device can be detected. In some implementations, the input is detected in response to a user touching a portion of a surface of the display that corresponds to a position in which the capturing button is displayed. In some implementations, the input is detected in response to a user touching or depressing a button, a switch, a softkey, a touchscreen display, and the like, of the electronic device. In some implementations, the input is detected in response to a voice command received at an audio input device of the electronic device. In response to detecting the input, a capturing command can be generated, and, in response to generating the capturing command, an image depicting an optical pattern in the scene can be captured using the camera 202. The captured image can be provided to the decoding engine 204.

The decoding engine 204 can be configured to decode optical patterns depicted in the captured images. Each optical pattern in the scene can be decoded to obtain code data 206 for the respective optical pattern. A detailed description of detecting and decoding multiple optical patterns depicted in images is described in commonly owned U.S. Pat. No. 10,963,658, which is hereby incorporated by reference in its entirety and for all purposes. The decoding engine 204 can be configured to provide the code data 206 to the intent engine 208.

The intent engine 208 can be configured to insert the code data 206 into an application object 210 that corresponds to the application 212. In some implementations, inserting the code data 206 into the application object 210 includes accessing user data stored in a cloud-based server (to be described later) that is in communication with the electronic device and formatting the application object 210 and/or code data 206 based on the user data. In some implementations, the user data can be accessed using a portal (to be described later) of the cloud-based server. In some implementations, the user data identifies an operating system of the electronic device and/or an application type for the application. In some implementations, the application object 210 and/or code data 206 can be formatted in a format that is suitable for the operating system and/or application and inserted into the application object 210. In some implementations, the application object 210 is an Intent of the Android operating system. In some implementations, the application object 210 is a messaging object of the operating system of the electronic device that can facilitate communications and/or actions between one or more applications and/or between one or more applications and the operating system of the electronic device.

The intent engine 208 can be further configured to send the application object 210 to the application 212 where it can be utilized by the application 212. In some implementations, in response to the application object 210 being sent to the application 212, another image depicting the same optical pattern and/or another optical pattern in the scene can be captured and the same optical pattern and/or the other optical pattern can be decoded to obtain code data, which can then be inserted into another application object for the same application and/or into an application object for another application installed on the electronic device.

Figure 3:
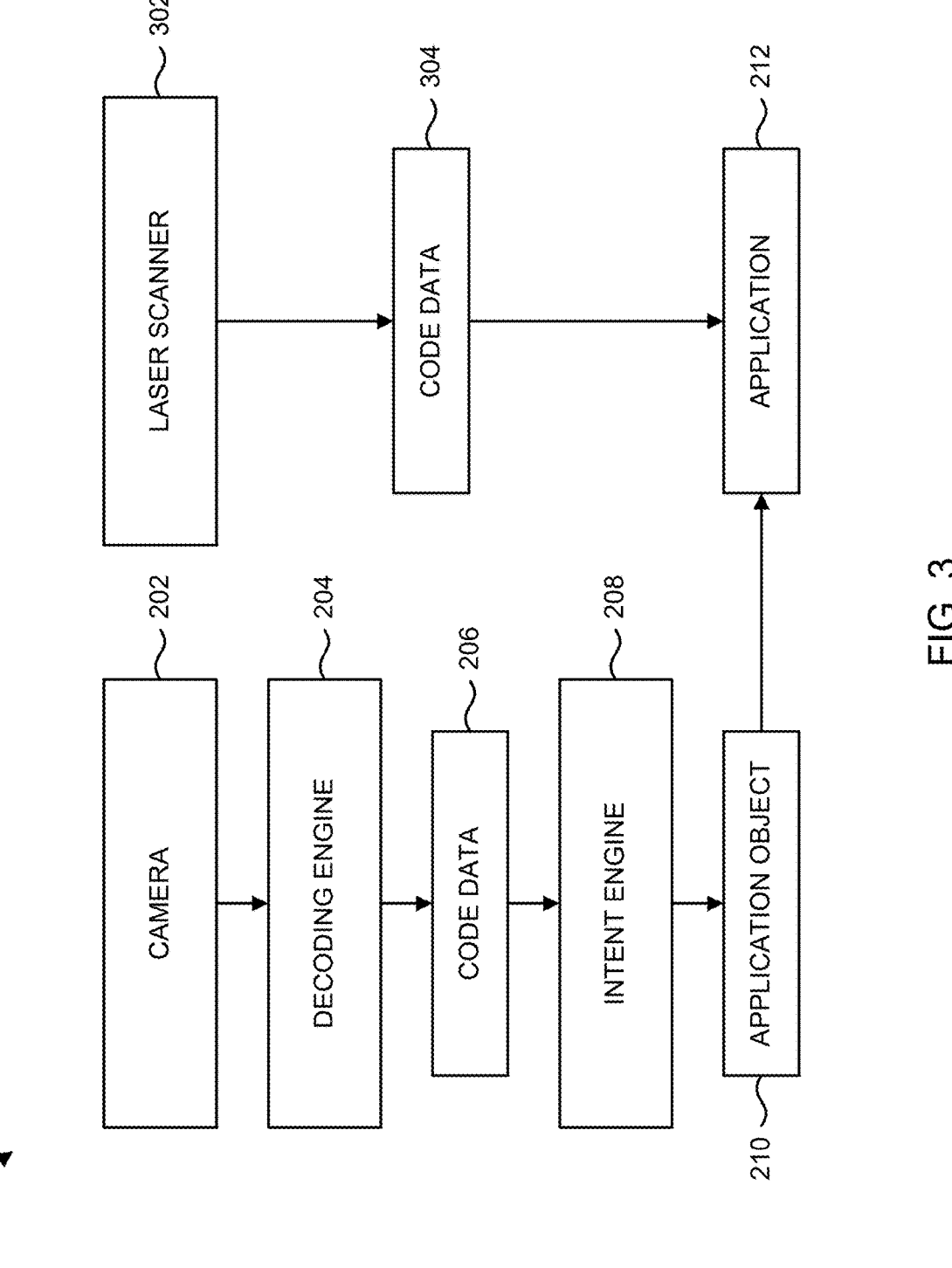
FIG. 3 is a simplified diagram of another embodiment of a workflow in an electronic device for scanning optical patterns, in accordance with some implementations.

FIG. 3 is a simplified diagram 300 of another embodiment of a workflow in an electronic device for scanning optical patterns. As shown in FIG. 3, the electronic device can include the camera 202 and the operating system, which can include the decoding engine 204, the intent engine 208, and the application 212. As further shown in FIG. 3, the electronic device can also include a laser scanner 302.

As described above, the camera 202 can be configured to capture images of a scene that includes one or more optical patterns, which can then be decoded by the decoding engine 204 to obtain the code data 206, which can then be inserted into the application object 210 for the application 212 by the intent engine 208.

The laser scanner 302 can be configured to generate code data 304 for the one or more optical patterns in the scene. In some implementations, to facilitate generating the code data 304, the scene can be illuminated with a laser light source, and, while the scene is being illuminated with the laser light source, an input to the electronic device can be detected. In some implementations, the input is detected in response to a user touching or depressing a button, a switch, a softkey, a touchscreen display, and the like, of the electronic device. In some implementations, the input is detected in response to a voice command received at the audio input device of the electronic device. In response to detecting the input, a scanning command is generated, and, in response to generating the scanning command, the code data 304 for an optical pattern in the scene is generated. Generating code data for an optical pattern in a scene using a laser scanner is well-known and associated techniques are included without including such detail herein in order to avoid obscuring the implementations.

As further shown in FIG. 3, the code data 304 generated by the laser scanner 302 is sent to the application 212 where it can be utilized by the application 212. In some implementations, in response to the code data 304 being sent to the application 212, additional code data for the same optical pattern and/or another optical pattern in the scene can be generated by the laser scanner and sent to the application 212.

In some implementations, it can be ascertained whether the electronic device is in a camera scanning mode or a laser scanning mode. In some implementations, a button, switch, softkey, touchscreen display, and the like, of the electronic device can be operated to select the camera scanning mode and the laser scanning mode. In response to ascertaining that the electronic device is in the laser scanning mode, the laser scanner 302 can generate the code data 304. In response to ascertaining that the electronic device is in the camera scanning mode, the camera 202 can be configured to capture images of a scene that includes one or more optical patterns, which can then be decoded by the decoding engine 204 to obtain the code data 206, which can then be inserted into the application object 210 for the application 212 by the intent engine 208.

Figure 4:
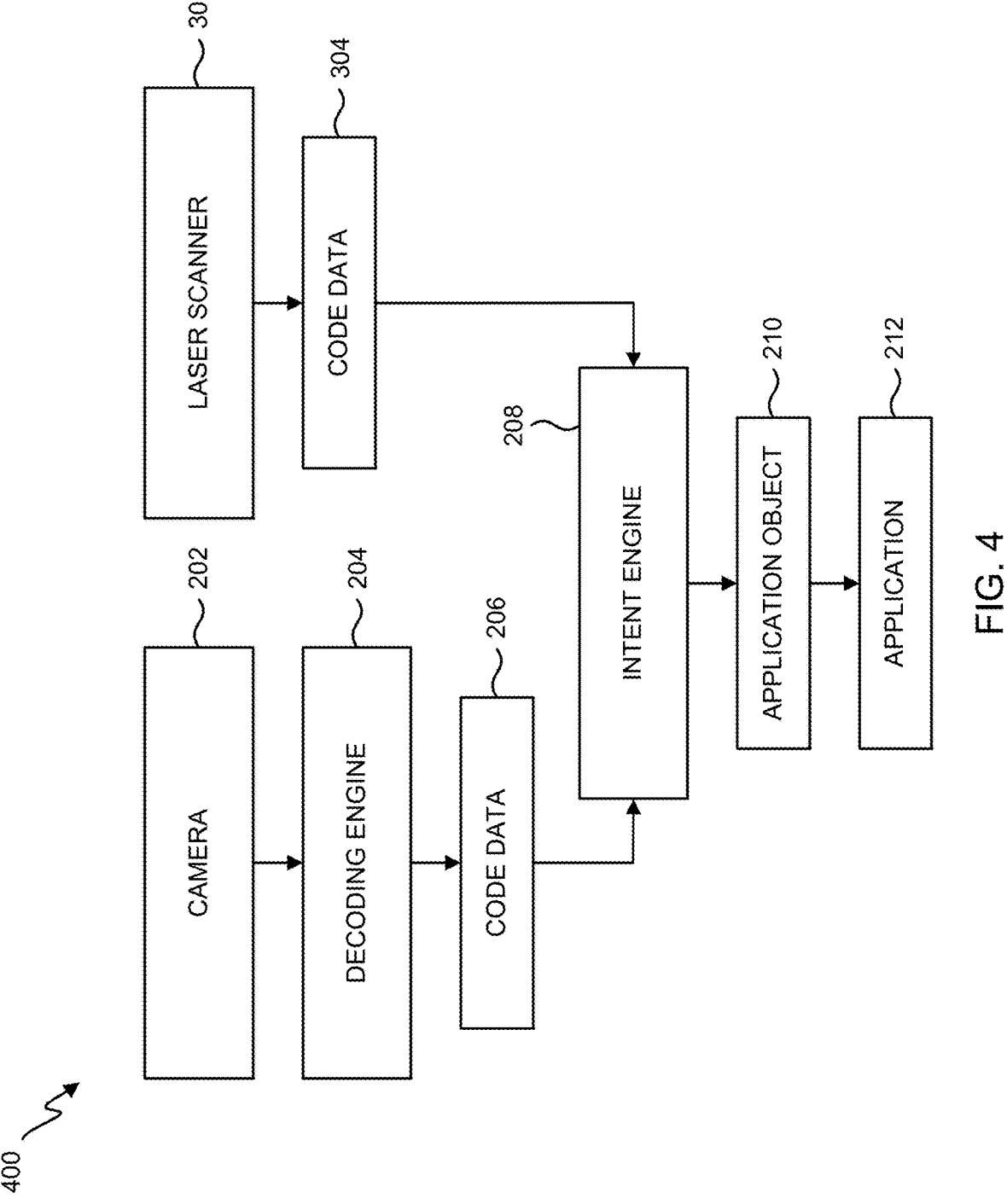
FIG. 4 is a simplified diagram of another embodiment of a workflow in an electronic device for scanning optical patterns, in accordance with some implementations.

In some implementations, rather than sending the code data 304 generated by the laser scanner 302 to the application 212, the code data 304 can inserted into the application object 210. For example, as shown in FIG. 4, which shows a simplified diagram 400 of another embodiment of a workflow in an electronic device for scanning optical patterns, the code data 304 can be provided to the intent engine 208, which can then, as described above, insert the code data 304 into the application object 210 and send the application object 210 to the application 212.

As described above, in some implementations, in response to the application object 210 being sent to the application 212, another image depicting another optical pattern in the scene can be captured and decoded to obtain code data for the other optical pattern, which can then be inserted into another application object for another application installed on the electronic device. Similarly, in response to the code data 304 being sent to the application 212, code data can be generated by the laser scanner 302 for another optical pattern and the code data for the other optical pattern can be sent to another application installed on the electronic device.

Figure 5:
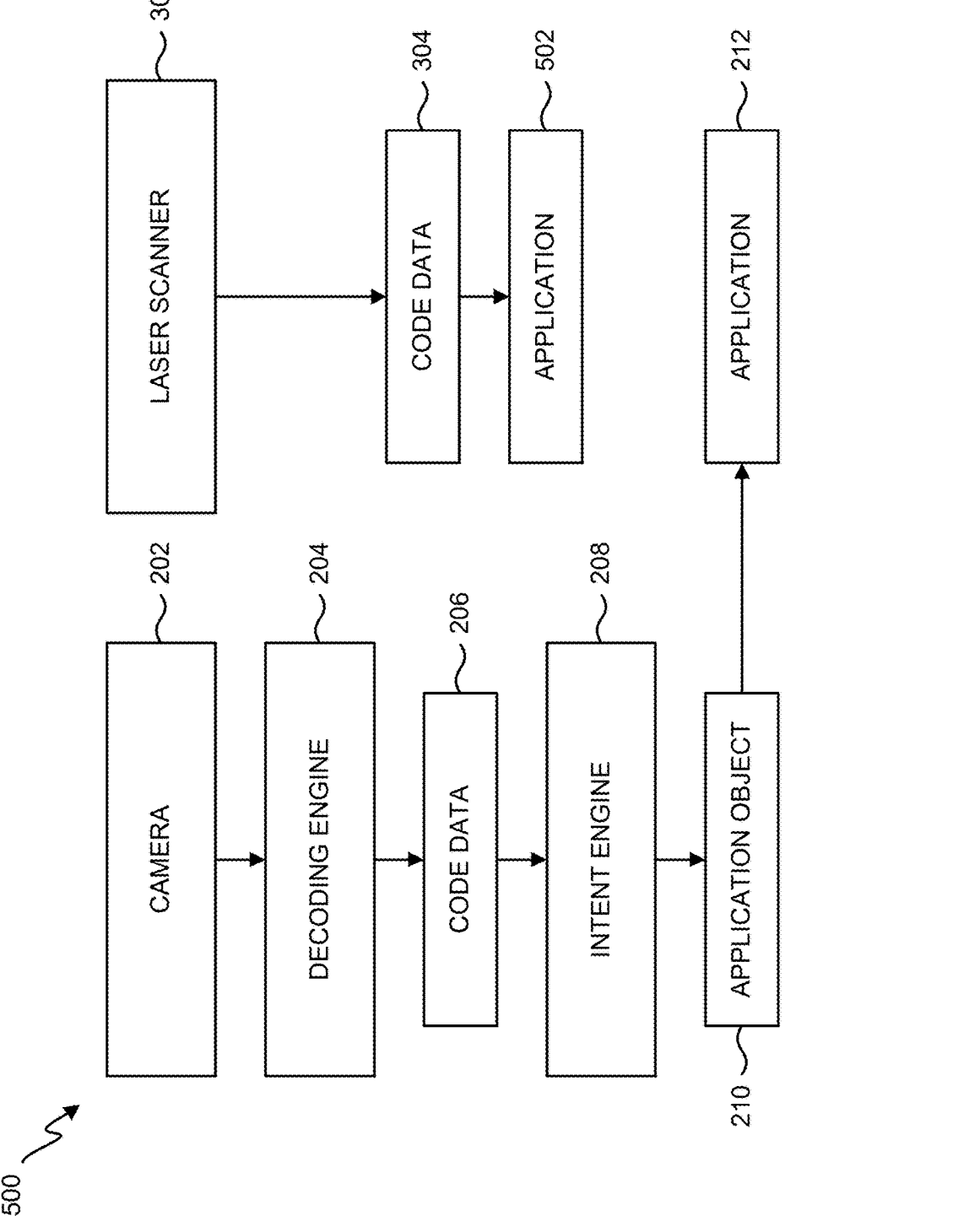
FIG. 5 is a simplified diagram of another embodiment of a workflow in an electronic device for scanning optical patterns, in accordance with some implementations.

FIG. 5 is a simplified diagram 500 of another embodiment of a workflow in an electronic device for scanning optical patterns. As shown in FIG. 5, the operating system can include two applications (the application 212 and application 502). In the case of FIG. 5, the intent engine 208 can be configured to insert the code data 206 obtained by decoding an optical pattern depicted by an image captured by the camera 202 into the application object 210 for the application 212. Similarly, the code data 304 generated by the laser scanner 302 for the same optical pattern and/or another optical pattern in the scene can be sent to the application 502. In some implementations, although not shown, the code data 206 can be inserted into the application object 210 and sent to the application 212 and inserted into an application object (not shown) for the application 502, which can be sent to the application 502. Similarly, although not shown, the code data 304 can be sent to the application 502 and the application 212. Other implementations, although not described, may be included such as inserting the code data 304 into both the application object 210 and other application objects for other applications and sending the application objects to the respective applications.

Figure 6:
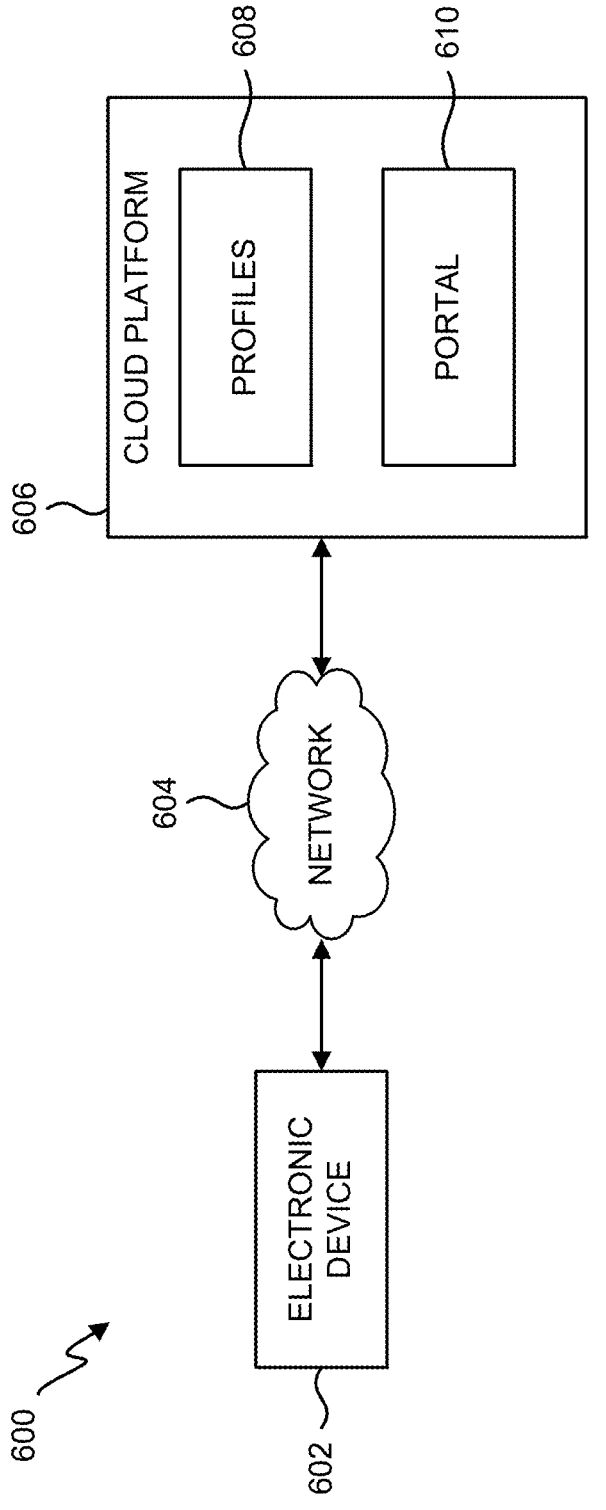
FIG. 6 is a simplified diagram of system for facilitating workflow improvements in electronic devices for scanning optical patterns, in accordance with some implementations.

As described above, code data can be inserted into an application object that corresponds to an application by accessing user data stored in a cloud-based server that is in communication with the electronic device and formatting the application object and/or code data based on the user data. FIG. 6 is a simplified diagram of system 600 for facilitating workflow improvements in electronic devices for scanning optical patterns. As shown in FIG. 6, an electronic device 602, which can be any of the electronic devices described with respect to FIGS. 2-5 or computing device 1100 shown in FIG. 11, can be in communication with a cloud platform 606 via a network 604. The cloud platform 606 can be any kind of cloud-server system hosted by a provider of such system (e.g., a cloud service provider). The network 604 can be any kind of network, public or private, wireless, or wired, that facilitates communication between the electronic device 602 and the cloud platform 606 using any communication protocol (e.g., the Internet, 6G, etc.).

Figure 7:
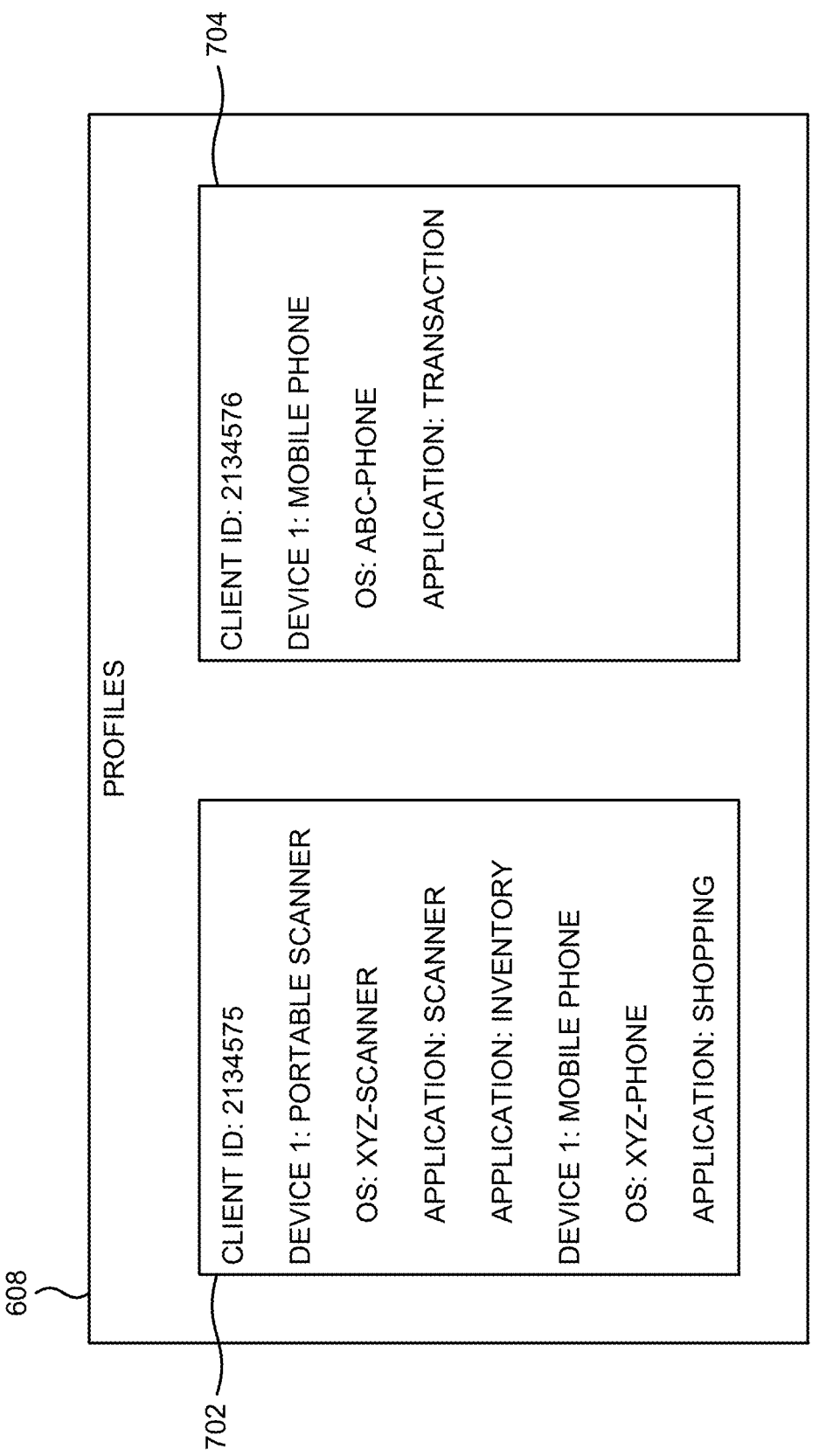
FIG. 7 is a simplified diagram of profiles for facilitating workflow improvements in electronic devices for scanning optical patterns, in accordance with some implementations.

As shown in FIG. 6, the cloud platform 606 can store profiles 608 and provide a portal 610. Each profile of the one or more profiles 608 can be associated with a user such as a customer, client, and the like, and can store user data for the user. The user data can include, but is not limited, a client ID for the user, a list of electronic devices that are associated with the user, the operating system of each of those electronic devices, and one or more applications that are installed on each of those electronic devices in which application objects including code data should be provided for. For example, as shown in FIG. 7, which shows a simplified diagram of profiles facilitating workflow improvements in electronic devices for scanning optical patterns, the profiles 608 can include profile 702 and 704. Each of the profiles 702, 704, can include a respective client ID which links the user to the respective profile for that user. As shown in FIG. 7, profile 702 identifies two electronic devices (Device 1, Device 2) that are associated with the client ID for the profile 702. Device 1 is a portable scanner that is executing the XYZ-Scanner operating system. Among the applications installed on the Device 1, profile 702 indicates that application objects including code data should be generated for the scanner application and the inventory application installed on the portable scanner. Device 2 is a mobile phone that is executing the XYZ-Mobile Phone operating system. Among the applications installed on Device 2, profile 702 further indicates that an application object including code data should be generated for the shopping application.

As described above, the intent engine 208 of the electronic devices shown in FIG. 2-5 can access user data included the profiles 608 and format the code data and/or the application object into a format that is suitable for the operating system of the respective electronic device and/or one or more applications installed on the respective electronic device based on the user data. For example, for the electronic device of FIG. 2, the user data for a user of the electronic device can identify the operating system of the electronic device (e.g., Android) and the application 212 in which the application object 210 including the code data 206 should be provided for.

In some implementations, an end user can access the portal 610 to modify one or more profiles included in the profiles 608 that are associated with the end user. For example, in the case of profiles 702, 704, an end user linked to the client ID of the profile 702 can access the portal 610 to modify the profile 702. To facilitate modification of profiles, the portal 610 can include one or more graphical user interface pages that can be presented on a display (e.g., a display of an electronic device or computing device). Each graphical user interface page can facilitate management of a profile of the profiles 608. For example, an end user can use an electronic device, log into the portal 610, and be presented, on the display of the electronic device, with one or more graphical user interface pages of the portal 610 for modifying a profile such as the profile 702 of the profiles 608. In some implementations, modifying a profile includes, but is not limited to, identifying electronic devices that are associated with the end user, an operating system for each of the identified electronic devices, and any applications installed on the electronic device in which application objects including code data for optical patterns in a scene should be provided for.

Figure 8:
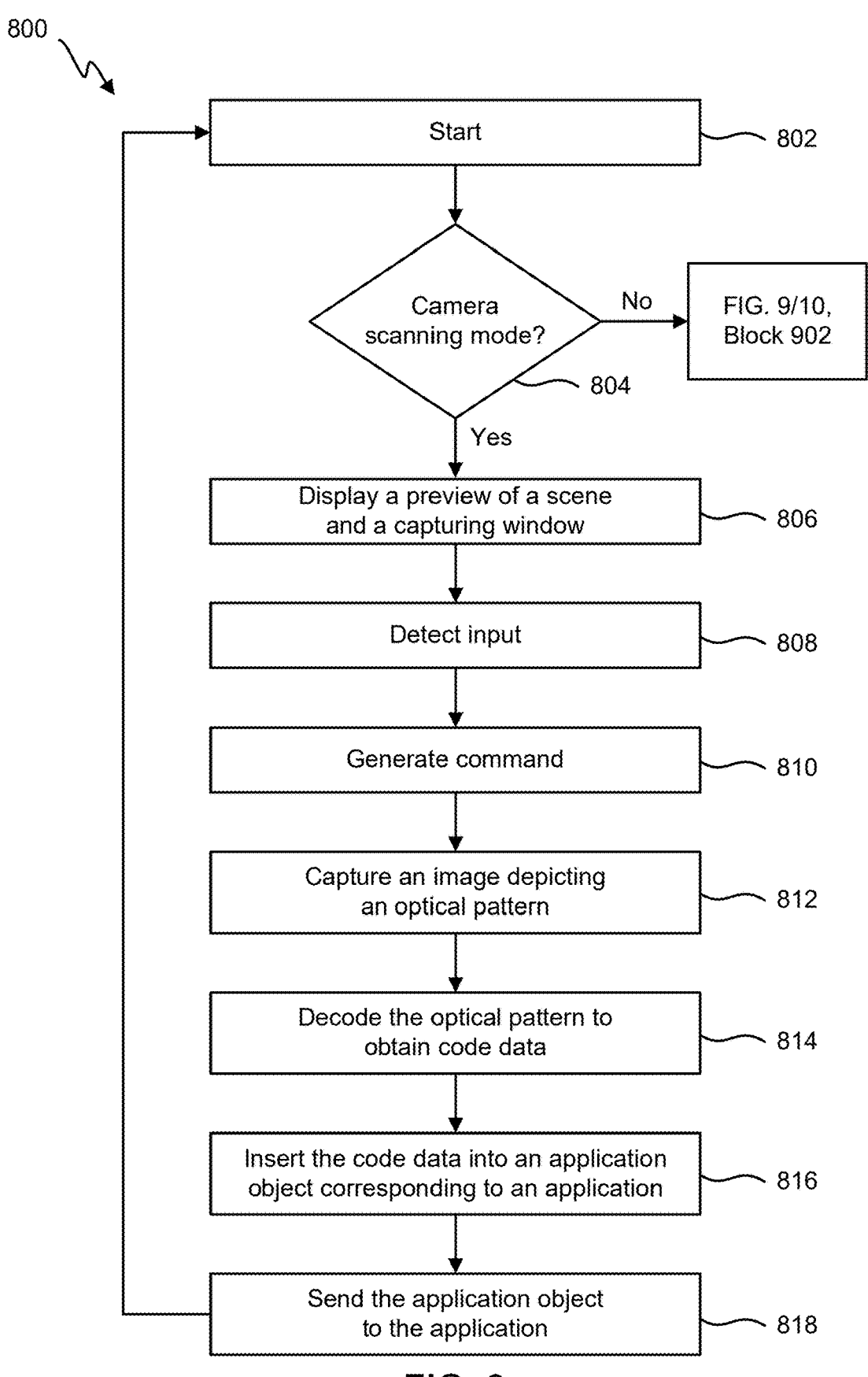
FIG. 8 illustrates an example of a process for managing a workflow in a camera scanning mode of an electronic device for scanning optical patterns, in accordance with some implementations.
Figure 9:
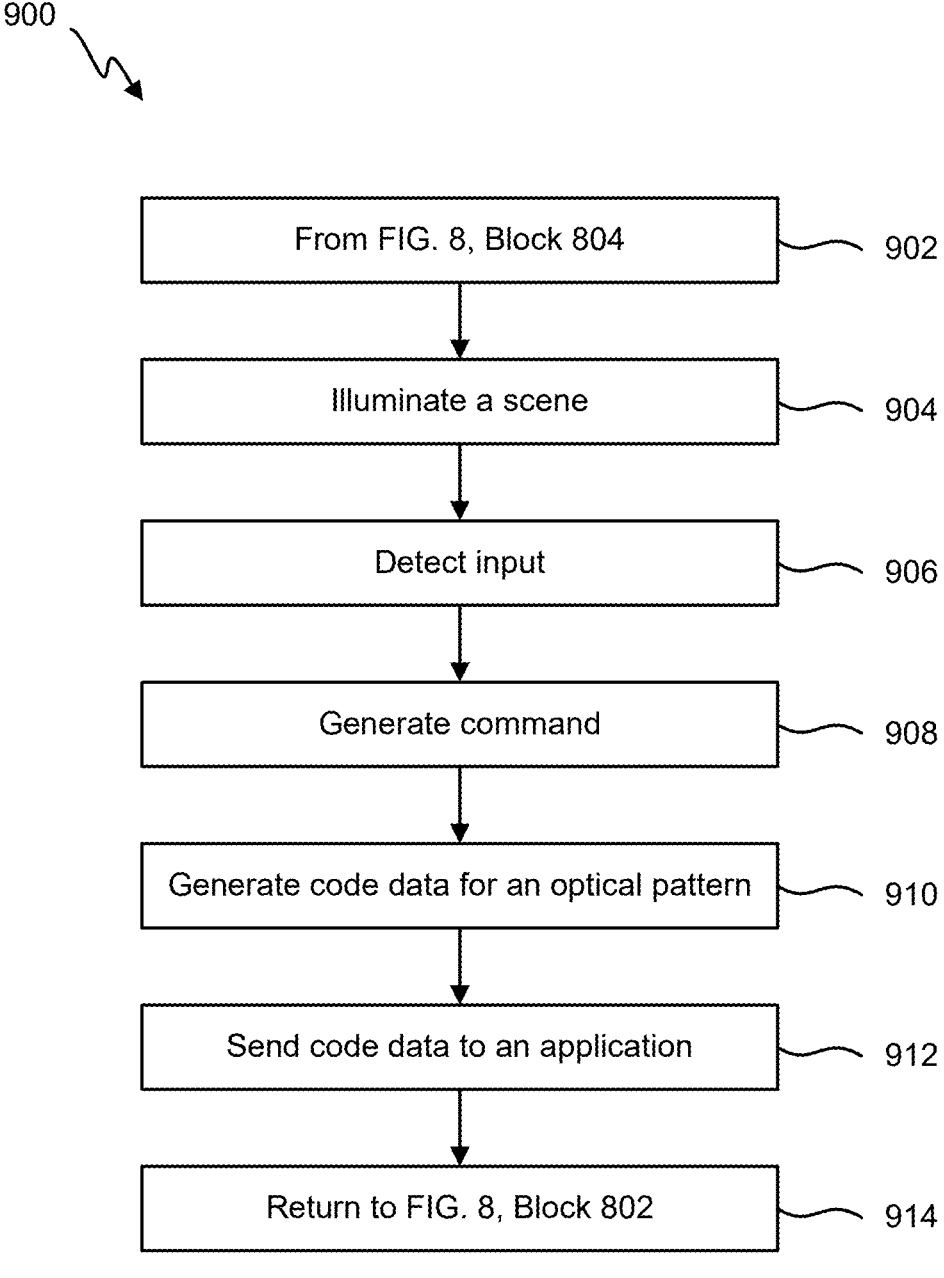
FIG. 9 illustrates an example of a process for managing a workflow in a laser scanning mode of an electronic device for scanning optical patterns, in accordance with some implementations.
Figure 10:
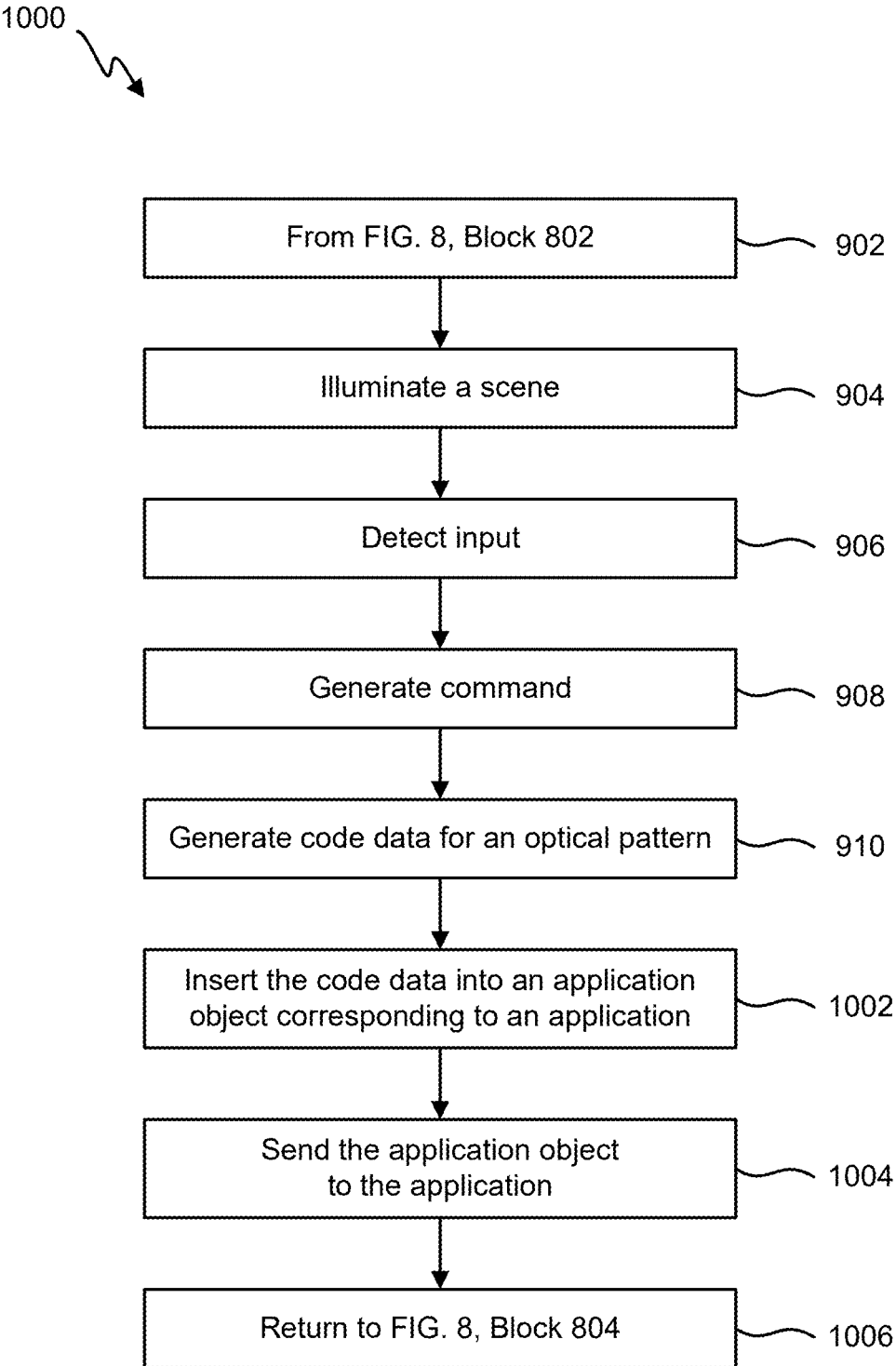
FIG. 10 illustrates another example of a process for managing a workflow in a laser scanning mode of an electronic device for scanning optical patterns, in accordance with some implementations.

FIG. 8 illustrates an example of a process 800 for managing a workflow in a camera scanning mode of an electronic device for scanning optical patterns. FIG. 9 illustrates an example of a process 900 for managing a workflow in a laser scanning mode of an electronic device for scanning optical patterns. FIG. 10 illustrates another example of a process 1000 for managing a workflow in a laser scanning mode of an electronic device for scanning optical patterns. The process depicted in FIGS. 8-10 can be implemented in software (e.g., code, instructions, program) that is executed by a processor such as processor of the computing device 1100 (FIG. 11), a cloud-computing platform, a distributed computing system, a combination thereof, and the like. The software may be stored on a non-transitory computer-readable storage medium (e.g., a memory device). The processes 800, 900, and 1000 are intended to be illustrative and non-limiting. For example, although FIGS. 8-10 depict the various processing steps occurring in a particular sequence or order, in other implementations, the steps may be performed in some different order or some steps may also be performed in parallel. The processes 800, 900, and 1000 start at block 802.

At block 804, it can be ascertained whether an electronic device is in a camera scanning mode or a laser scanning mode. An electronic device for optical patterns can include a camera for capturing images of optical patterns in a scene and/or a laser scanner for acquiring code data for optical patterns in the scene. In a case the electronic device includes a camera and a laser scanner, the electronic device can be configured to operate in a camera scanning mode to capture images of the optical patterns in the scene and in a laser scanning mode to acquire code data for the optical patterns in the scene. In some implementations, a button, switch, softkey, touchscreen display, and the like, of the electronic device can be operated to select the camera scanning mode and the laser scanning mode. In response to ascertaining that the electronic device is in the laser scanning mode, the process proceeds to block 902. In response to ascertaining that the electronic device is in the camera scanning mode, the process proceeds to block 806. In a case the electronic device includes the camera but does not include the laser scanner, the electronic device can be configured to operate in the camera scanning mode and the process can proceed to directly to block 806 without performing the ascertaining of block 804.

At block 806, in response to ascertaining that the electronic device is in the camera scanning mode or when the electronic device includes a camera but does not include a laser scanner, a graphical user interface page of an application installed on the electronic device, a preview of the scene, and a capturing button are displayed on a display of the electronic device. In some implementations, the preview of the scene and the capturing button at least partially overlay the graphical user interface page. The scene can include one or more optical patterns. In some implementations, the application can be one of a plurality of applications installed on the electronic device.

At block 808, while the preview of the scene and the capturing button are being displayed, an input to the electronic device is detected. In some implementations, the input is detected in response to a user touching a portion of a surface of the display that corresponds to a position in which the capturing button is displayed. In some implementations, the input is detected in response to a user touching or depressing a button, a switch, a softkey, a touchscreen display, and the like, of the electronic device. In some implementations, the input is detected in response to a voice command received at an audio input device of the electronic device.

At block 810, in response to detecting the input, a capturing command is generated.

At block 812, in response to generating the capturing command, an image depicting an optical pattern in the scene is captured using the camera of the electronic device. In some implementations, the camera can include one or more optical elements, one or more illumination units, and one or more image capturing units. The one or more optical elements, illumination units, and image capturing units can be configured to capture images of a scene that includes one or more optical patterns.

At block 814, the optical pattern depicted within the image is decoded to obtain code data for the optical pattern.

At block 816, the code data is inserted into an application object that corresponds to the application installed on the electronic device. In some implementations, inserting the code data into the application object includes accessing user data stored in a cloud-based server and formatting the application object and/or code data based on the user data. In some implementations, the user data can be accessed using a portal of the cloud-based server. In some implementations, the user data identifies an operating system of the electronic device and/or an application type for the application. In some implementations, the application object and/or code data can be formatted in a format that is suitable for the operating system and/or application and inserted into the application object. In some implementations, the application object is an Intent of the Android operating system. In some implementations, the application object is a messaging object of the operating system of the electronic device that can facilitate communications and/or actions between one or more applications and/or between one or more applications and the operating system of the electronic device.

At block 818, the application object is sent to the application. In some implementations, in response to the application object being sent to the application, the process proceeds to block 802 where the process can be restarted. In some implementations, when the process restarts at block 802, another image depicting the same optical pattern and/or another optical pattern in the scene can be captured and the same optical pattern and/or the other optical pattern can be decoded to obtain code data. Additionally, the code data can be inserted into another application object for the same application and/or into an application object for another application installed on the electronic device.

As indicated above, in a case the electronic device includes a laser scanner and in response to ascertaining that the electronic device is in the laser scanning mode, the process proceeds to block 902 (FIG. 9/FIG. 10). At block 904, a scene (e.g., the same scene and/or another scene) is illuminated with a laser light source.

At block 906, while the scene is being illuminated with the laser light source, an input to the electronic device is detected. In some implementations, the input is detected in response to a user touching or depressing a button, a switch, a softkey, a touchscreen display, and the like, of the electronic device. In some implementations, the input is detected in response to a voice command received at the audio input device of the electronic device.

At block 908, in response to detecting the input, a scanning command is generated.

At block 910, in response to generating the scanning command, code data for an optical pattern in the scene is generated using the laser scanner of the electronic device.

At block 912, the code data is sent to the application. In some implementations, in response to the code data being sent to the application, at block 914, the process can return to block 802 where the process can restart. In some implementations, when the process restarts at block 802, code data for the same optical pattern and/or another optical pattern in the scene can be generated and sent to the same application and/or another application installed on the electronic device.

In some implementations, rather than sending the code data generated by the laser scanner to an application, at block 1002, the code data is inserted into an application object that corresponds to the application installed on the electronic device. In some implementations, inserting the code data into the application object includes accessing user data stored in the cloud-based server and formatting the application object and/or code data based on the user data as described above.

At block 1004, the application object is sent to the application. In some implementations, in response to the application object being sent to the application, at block 1006, the process can return to block 802 where the process can restart. In some implementations, when the process restarts at block 802, additional code data can be generated for the same optical pattern and/or another optical pattern in the scene and sent to the same application and/or another application and/or inserted into an application object for the same application and/or into an application object for another application installed on the electronic device.

Figure 11:
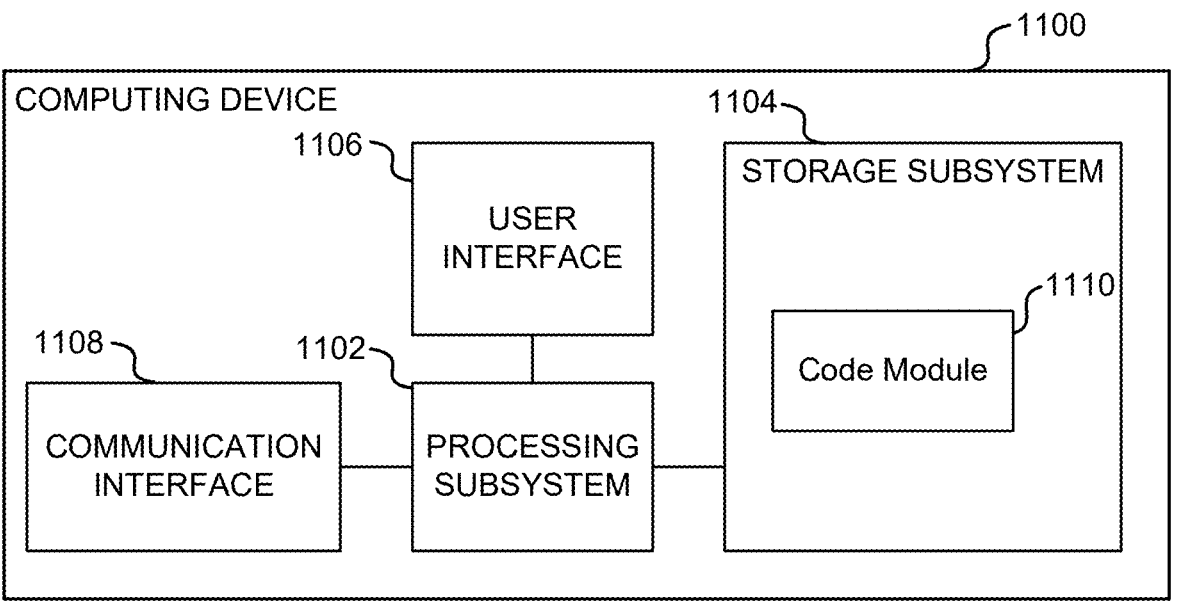
FIG. 11 depicts a block diagram of an embodiment of a computer system.

FIG. 11 is a simplified block diagram of a computing device 1100. Computing device 1100 can implement some or all functions, behaviors, and/or capabilities described above that would use electronic storage or processing, as well as other functions, behaviors, or capabilities not expressly described. Computing device 1100 includes a processing subsystem 1102, a storage subsystem 1104, a user interface 1106, and/or a communication interface 1108. Computing device 1100 can also include other components (not explicitly shown) such as a battery, power controllers, and other components operable to provide various enhanced capabilities. In various embodiments, computing device 1100 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1104 can be implemented using a local storage and/or removable storage medium, e.g., using disk, flash memory (e.g., secure digital card, universal serial bus flash drive), or any other non transitory storage medium, or a combination of media, and can include volatile and/or non volatile storage media. Local storage can include random access memory (RAM), including dynamic RAM (DRAM), static RAM (SRAM), or battery backed up RAM. In some embodiments, storage subsystem 1104 can store one or more applications and/or operating system programs to be executed by processing subsystem 1102, including programs to implement some or all operations described above that would be performed using a computer. For example, storage subsystem 1104 can store one or more code modules 1110 for implementing one or more method steps described above.

A firmware and/or software implementation may be implemented with modules (e.g., procedures, functions, and so on). A machine-readable medium tangibly embodying instructions may be used in implementing methodologies described herein. Code modules 1110 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1110) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1110 may comprise sets of instructions (codes) embodied on a computer-readable medium that directs a processor of a computing device 1100 to perform corresponding actions. The instructions may be configured to run in sequential order, in parallel (such as under different processing threads), or in a combination thereof. After loading a code module 1110 on a general purpose computer system, the general purpose computer is transformed into a special purpose computer system.

Computer programs incorporating various features described herein (e.g., in one or more code modules 1110) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 1104 can also store information useful for establishing network connections using the communication interface 1108.

User interface 1106 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 1106 to invoke the functionality of computing device 1100 and can view and/or hear output from computing device 1100 via output devices of user interface 1106. For some embodiments, the user interface 1106 might not be present (e.g., for a process using an ASIC).

Processing subsystem 1102 can be implemented as one or more processors (e.g., integrated circuits, one or more single core or multi core microprocessors, microcontrollers, central processing unit, graphics processing unit, etc.). In operation, processing subsystem 1102 can control the operation of computing device 1100. In some embodiments, processing subsystem 1102 can execute a variety of programs in response to program code and can maintain multiple concurrently executing programs or processes. At a given time, some or all of a program code to be executed can reside in processing subsystem 1102 and/or in storage media, such as storage subsystem 1104. Through programming, processing subsystem 1102 can provide various functionality for computing device 1100. Processing subsystem 1102 can also execute other programs to control other functions of computing device 1100, including programs that may be stored in storage subsystem 1104.

Communication interface 1108 can provide voice and/or data communication capability for computing device 1100. In some embodiments, communication interface 1108 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 1108 can provide wired connectivity (e.g., universal serial bus, Ethernet, universal asynchronous receiver/transmitter, etc.) in addition to, or in lieu of, a wireless interface. Communication interface 1108 can be implemented using a combination of hardware (e.g., driver circuits, antennas, modulators/demodulators, encoders/decoders, and other analog and/or digital signal processing circuits) and software components. In some embodiments, communication interface 1108 can support multiple communication channels concurrently. In some embodiments the communication interface 1108 is not used.

It will be appreciated that computing device 1100 is illustrative and that variations and modifications are possible. A computing device can have various functionality not specifically described (e.g., voice communication via cellular telephone networks) and can include components appropriate to such functionality.

Further, while the computing device 1100 is described with reference to particular blocks, it is to be understood that these blocks are defined for convenience of description and are not intended to imply a particular physical arrangement of component parts. For example, the processing subsystem 1102, the storage subsystem, the user interface 1106, and/or the communication interface 1108 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1100.

Various features described herein, e.g., methods, apparatus, computer readable media, and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. An electronic device comprising:
a camera;
a processing system comprising one or more processors; and
one or more computer readable storage media storing instructions which, when executed by the one or more processors, cause the electronic device to perform operations comprising:
ascertaining whether the electronic device is in a first scanning mode or a second scanning mode;
in response to determining that the electronic device is in the first scanning mode:
generating a capturing command;

in response to generating the capturing command, capturing, using the camera, an image depicting one or more optical patterns in a scene;
decoding, based on the image, a first optical pattern of the one or more optical patterns to obtain first code data for the first optical pattern;
inserting the first code data into an application object corresponding to an application of a plurality of applications installed on the electronic device; and
sending the application object to the application; and
in response to determining that the electronic device is in the second scanning mode:
generating second code data for a second optical pattern of the one or more optical patterns; and
sending the second code data to the application.

2. The electronic device of claim 1, the operations further comprising:
generating a scanning command; and
in response to generating the scanning command, generating, using a laser scanner, the second code data.

3. The electronic device of claim 2, wherein the scanning command is generated in response to input received at a button of the electronic device.

4. The electronic device of claim 1, wherein the capturing command is generated in response to input received at a display of the electronic device.

5. The electronic device of claim 1, the operations further comprising:
prior to generating the capturing command:
displaying, on a display of the electronic device, a graphical user interface page of the application, a preview of the scene, and a capturing button, wherein the preview of the scene and the capturing button partially overlay the graphical user interface page.

6. The electronic device of claim 5, wherein the capturing command is generated in response to a user touching a portion of a surface of the display, the portion of the surface corresponding to a position in which the capturing button is displayed.

7. The electronic device of claim 1, wherein the inserting the first code data into the application object comprises accessing user data stored in a cloud-based server and formatting the application object based on the user data.

8. The electronic device of claim 7, wherein the user data identifies an operating system of the electronic device.

9. The electronic device of claim 7, wherein the user data identifies an application type for the application.

10. The electronic device of claim 1, wherein the application object is a first application object, and the operations further comprising:
generating a scanning command;
in response to generating the scanning command, generating, using a laser scanner, third code data for a third optical pattern of the one or more optical patterns;
inserting the third code data into a second application object corresponding to the application; and
sending the second application object to the application.

11. The electronic device of claim 1, wherein the application object is a first application object, wherein the application is a first application, and the operations further comprising:
decoding, based on the image, a third optical pattern of the one or more optical patterns to obtain third code data for the third optical pattern;

inserting the third code data into a second application object corresponding to a second application of the plurality of applications installed on the electronic device; and sending the second application object to the second application.

12. A method comprising:

ascertaining whether a electronic device is in a first scanning mode or a second scanning mode;

in response to determining that the electronic device is in the first scanning mode:

generating a capturing command;

in response to generating the capturing command, capturing, using a camera, an image depicting one or more optical patterns in a scene;

decoding, based on the image, a first optical pattern of the one or more optical patterns to obtain first code data for the first optical pattern;

inserting the first code data into an application object corresponding to an application of a plurality of applications installed on the electronic device; and sending the application object to the application; and in response to determining that the electronic device is in the second scanning mode:

generating second code data for a second optical pattern of the one or more optical patterns; and sending the second code data to the application.

13. The method of claim 12, further comprising:

generating a scanning command; and in response to generating the scanning command, generating, using a laser scanner, the second code data.

14. The method of claim 12, further comprising:

prior to generating a capturing command:

displaying, on a display of the electronic device, a graphical user interface page of the application, a preview of the scene, and a capturing button, wherein the preview of the scene and the capturing button partially overlay the graphical user interface page, wherein the capturing command is generated in response to a user touching a portion of a surface of the display, the portion of the surface corresponding to a position in which the capturing button is displayed.

15. The method of claim 12, wherein the application object is a first application object, and the method further comprising:

generating a scanning command;

in response to generating the scanning command, generating, using a laser scanner, third code data for a third optical pattern of the one or more optical patterns;

inserting the third code data into a second application object corresponding to the application; and sending the second application object to the application.

16. The method of claim 12, wherein the application object is a first application object, wherein the application is a first application, and the method further comprises:

decoding, based on the image, a third optical pattern of the one or more optical patterns to obtain third code data for the third optical pattern;

inserting the third code data into a second application object corresponding to a second application of the plurality of applications installed on the electronic device; and sending the second application object to the second application.

17. One or more non-transitory computer-readable media storing computer-readable instructions that, when executed by one or more processors, cause an electronic device to perform operations comprising:

ascertaining whether the electronic device is in a first scanning mode or a second scanning mode;

in response to determining that the electronic device is in the first scanning mode:

displaying, on a display of the electronic device, a graphical user interface page of an application of a plurality of applications installed on the electronic device, a preview of a scene, and a capturing button, wherein the preview of the scene and the capturing button partially overlay the graphical user interface page;

generating a capturing command, wherein the capturing command is generated in response to a user touching a portion of a surface of the display, the portion of the surface corresponding to a position in which the capturing button is displayed;

in response to generating the capturing command, capturing, using a camera of the electronic device, an image depicting one or more optical patterns in a scene;

decoding, based on the image, an optical pattern of the one or more optical patterns to obtain code data for the optical pattern;

inserting the code data into an application object corresponding to an application of a plurality of applications installed on the electronic device by converting a first format of the code data to a second format associated with the application and generating the application object based on the code data formatted in the second format; and sending the application object to the application; and in response to determining that the electronic device is in the second scanning mode:

generating second code data for a second optical pattern of the one or more optical patterns; and sending the second code data to the application.

18. The one or more non-transitory computer-readable media of claim 17, the operations further comprising:

generating a scanning command; and in response to generating the scanning command, generating, using a laser scanner, the second code data.

19. The one or more non-transitory computer-readable media of claim 17, wherein the application object is a first application object, and the operations further comprising:

generating a scanning command;

in response to generating the scanning command, generating, using a laser scanner, third code data for a third optical pattern of the one or more optical patterns;

inserting the third code data into a second application object corresponding to the application; and sending the second application object to the application.

20. The one or more non-transitory computer-readable media of claim 17, wherein the application object is a first application object, and the operations further comprising:

decoding, based on the image, a third optical pattern of the one or more optical patterns to obtain third code data for the third optical pattern;

inserting the third code data into a second application object corresponding to a second application of the plurality of applications installed on the electronic device; and sending the second application object to the second application.

* * * * *